No. 714,584. Patented Nov. 25, 1902.
H. A. KEINER.
SHEET METAL HANDLE.
(Application filed Jan. 18, 1902.)
(No Model.)
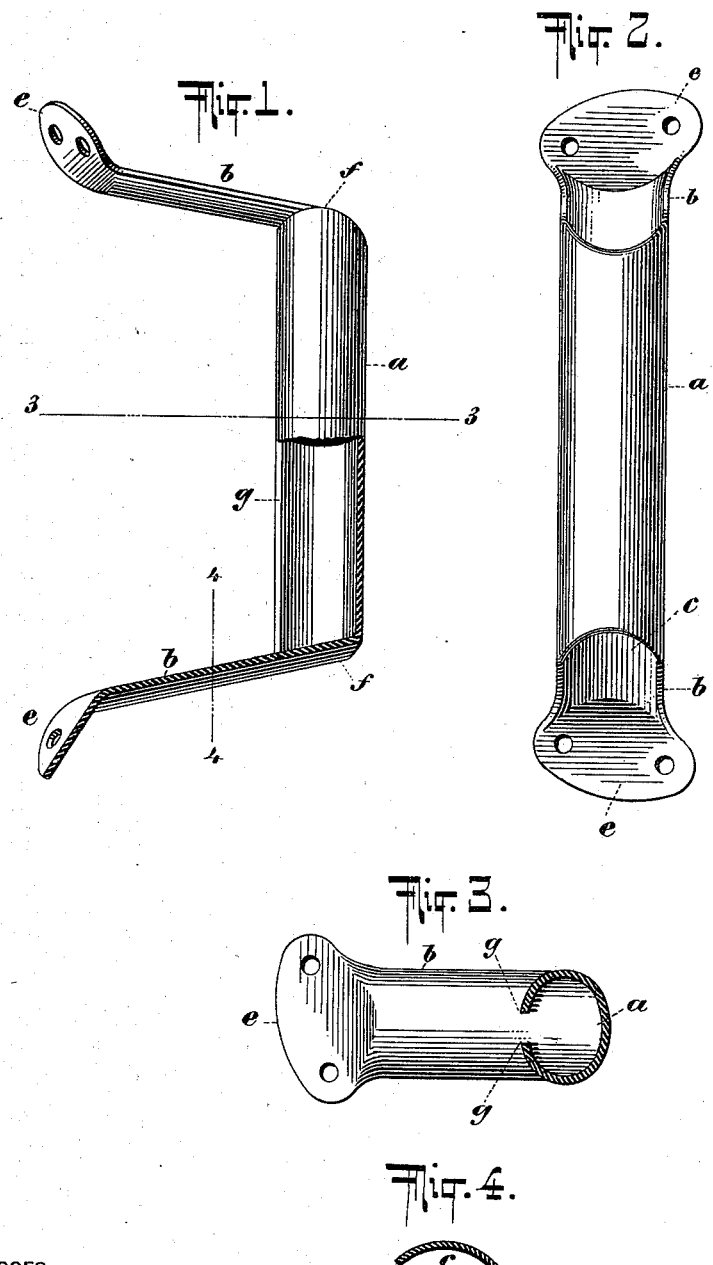

UNITED STATES PATENT OFFICE.

HENRY A. KEINER, OF BROOKLYN, NEW YORK, ASSIGNOR TO ELIZABETH C. SEAMAN, OF NEW YORK, N. Y.

SHEET-METAL HANDLE.

SPECIFICATION forming part of Letters Patent No. 714,584, dated November 25, 1902.

Application filed January 18, 1902. Serial No. 90,360. (No model.)

*To all whom it may concern:*

Be it known that I, HENRY A. KEINER, a citizen of the United States, and a resident of the borough of Brooklyn, county of Kings, city and State of New York, have invented certain new and useful Improvements in Sheet-Metal Handles, of which the following is a specification.

My invention relates to sheet-metal handles, and has for its object to produce from a single sheet or blank a strong cheap handle.

In the accompanying drawings I have shown a handle embodying my invention.

In the drawings, Figure I is a side elevation of the handle, partly in section. Fig. II is a plan view. Fig. III is a section on line 3 3 of Fig. I, and Fig. IV is a section on line 4 4 of Fig. I.

The improved handle is formed of a single blank having a portion that is bent in the form of a tube to form the grip $a$, having edges $g\ g$, shown as out of contact with each other, and other portions are combined to form the arms $b$, which project downwardly from the grip and have at their extremities ears $e$, which are adapted to be secured to a can, tub, or other article. These arms are curved in cross-section and are dished inwardly, so as to entirely close the open end of the grip, the ends of the grip being cut away on the lines $f$ to receive the dished arms $b$. The arms $b$ are bent sharply at the points where they join the grip and fit snugly into the cut-away portions $f$. By constructing the handle in this fashion it is trussed very strongly to resist crushing strains and is also structurally very strong to take up lifting strains.

Having described my invention, what I claim, and desire to secure by Letters Patent, is—

1. As a new article of manufacture a sheet-metal handle having a hollow tubular grip, convex on its top surface and arms of curved shape in cross-section and dished inwardly to close the end of the hollow grip, the said grip having its ends cut away so as to receive the said inwardly-dished arms to effect closure of the ends of the grip, and means for securing the arms to a vessel.

2. As a new and useful article of manufacture a sheet-metal handle having a hollow tubular grip, convex on its top surface, and integral therewith, inwardly-dished arms $b$, said inwardly-dished arms being bent sharply at the points where they join the grip, the said grip having its ends cut away so as to receive the said inwardly-dished arms, which inwardly-dished arms fit snugly therein, and ears for securing the said inwardly-dished arms to a vessel.

HENRY A. KEINER.

Witnesses:
C. A. GUIBERT,
GEO. E. MORSE.